United States Patent
Kawakita et al.

(10) Patent No.: US 8,637,121 B2
(45) Date of Patent: Jan. 28, 2014

(54) RESIN COATED MEMBER AND METHOD OF RESIN COATING

(75) Inventors: Jin Kawakita, Ibaraki (JP); Seiji Kuroda, Ibaraki (JP); Masayuki Komatsu, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 834 days.

(21) Appl. No.: 12/452,611

(22) PCT Filed: Jul. 14, 2008

(86) PCT No.: PCT/JP2008/062718
§ 371 (c)(1),
(2), (4) Date: Mar. 18, 2010

(87) PCT Pub. No.: WO2009/011343
PCT Pub. Date: Jan. 22, 2009

(65) Prior Publication Data
US 2010/0183842 A1  Jul. 22, 2010

(30) Foreign Application Priority Data
Jul. 13, 2007 (JP) ................. 2007-184340

(51) Int. Cl.
B05D 1/10 (2006.01)
B05D 1/02 (2006.01)

(52) U.S. Cl.
USPC .......................... 427/447; 427/195

(58) Field of Classification Search
USPC ....................................... 427/447
See application file for complete search history.

(56) References Cited

U.S. PATENT DOCUMENTS 5,285,967 A * 2/1994 Weidman ................ 239/80
2010/0136229 A1 * 6/2010 Kawakita et al. ........... 427/180

FOREIGN PATENT DOCUMENTS

| JP | 9-117992 | 5/1997 |
| JP | 2006-274326 | * 10/2006 |
| WO | 2008/068942 | * 6/2008 |

OTHER PUBLICATIONS

International Search Report issued Oct. 21, 2008 in International (PCT) Application No. PCT/JP2008/062718.

*Primary Examiner* — Katherine A Bareford
(74) *Attorney, Agent, or Firm* — Wenderoth, Lind & Ponack, L.L.P.

(57) ABSTRACT

A coating method through HVOF spraying that comprises generating a combustion jet in a combustion chamber connected to one end of a barrel while controlling the temperature of the combustion jet by supply of an inert gas to the jet, feeding resin coating materials into the temperature-controlled combustion jet and leading them to pass through the barrel, and spouting the coating particles through a spout port along with the combustion jet therethrough to thereby coat the substrate surface; wherein the length of the barrel, the temperature of the combustion jet and the physical properties of the coating particles are defined so as to satisfy both the following formulae (1) and (2).

Numerical Formula 1

$$\frac{\sqrt{\alpha \times t}}{r} > 0.5 \quad (1)$$

Numerical Formula 2

$$2.5 < \frac{T_{av}}{T_{cp}} < 4.5 \quad (2)$$

5 Claims, 7 Drawing Sheets

Fig. 2

(Mass Flow Rate of Nitrogen Gas)/(Mass Flow Rte of Combustion Gas)

RESIN COATED MEMBER AND METHOD OF RESIN COATING

This application is a U.S. national stage of International Application No. PCT/JP2008/062718 filed Jul. 14, 2008.

TECHNICAL FIELD

The present invention relates to a resin coated member where the substrate surface is directly coated with a resin coating material, and to a resin coating method for producing it.

BACKGROUND ART

Heretofore, since resins such as typically plastics are excellent in corrosion resistance and transformation acceptability, it is often that the surfaces of various substrates such as iron, aluminium and the like are coated for protection with resins such as plastics, taking the advantages of the properties of those resins, and thereafter the coated substrates are worked and shaped.

In this case, a thick coating may be formed by casting a molten plastic material onto a substrate; however, it is difficult to form a uniform thin film having a thickness of, for example, at most 100 microns. A resin such as an ultra-high-molecular weight polyethylene or the like has poor fluidity, to which, therefore, a coating method that comprises melting and fluidizing a powder could not be applied.

As a thin coating method for an objective substrate with a resin or the like, there is known a vapor deposition method or the like, which, however, requires special facilities and is not applicable at all to a large substrate; and therefore, in general, a resin solution dissolved in a solvent is applied to such a substrate.

The solvent-based resin coating has many problems in that the solvent may degradate resins or may damage substrates and the solvent may scatter to have some negative influences on the workers and on the environment; and if possible, solvent-free resin coating is desired.

On the other hand, regarding thin-film coating with an inorganic material, HVOF spraying (high-velocity oxy fuel spraying), which requires no solvent at all and which readily attains spray coating of a substrate with an inorganic material using a spray gun, has achieved many satisfactory results.

A technique of spraying a substrate with a heat-resistant resin such as PEEK (polyether-ether ketone) or the like through such HVOF spraying is disclosed in the following references (see Patent References 1 and 2). However, according to these methods, it is indispensable to previously roughen the surface of the substrate and/or form on the substrate surface a bonding layer having good adhesiveness to resin, for which, therefore, the working steps may increase and the methods could not exceed the category of the above-mentioned coating technique. In addition, the resin coating members to be obtained are substantially those where the bonding layer stands in the interface between the coating material and the substrate. Further, in mere melt coating of the roughened surface with PEEK by HVOF spraying, the coating material could not break into the fine irregularities of the substrate surface, and strong coating could not be realized.
Patent Reference 1: JP-A 2000-96203
Patent Reference 2: JP-A 2007-175881

In the above-mentioned background, the subject matter of the present invention is to solve the prior-art problems and to provide a coated member in which the coating resin and the substrate strongly adhere to each other by a physical structure, and a resin coating method for producing the coated member not requiring any coating treatment at all.

DISCLOSURE OF THE INVENTION

For solving the above-mentioned problems, the invention is characterized by the following:

The resin coated member of the invention 1 is a resin coated member of which the substrate surface is coated with a coating material comprising a resin, wherein the interface between the coating material and the substrate surface has a structure of such that the two break in each other with at least micron-pitch irregularities.

The resin coated member of the invention 2 is that, in the above invention 1, the coating particles are of ultra-high-molecular weight polyethylene.

The resin coating method of the invention 3 is a coating method through HVOF spraying that comprises generating a combustion jet in a combustion chamber connected to one end of a barrel while controlling the temperature of the combustion jet by supply of an inert gas to the jet, feeding resin coating materials into the temperature-controlled combustion jet and leading them to pass through the barrel, and spouting the coating particles through a spout port along with the combustion jet therethrough to thereby coat the substrate surface; wherein the length of the barrel, the temperature of the combustion jet and the physical properties of the coating particles are defined so as to satisfy both the following formulae (1) and (2):

Numerical Formula 1

$$\frac{\sqrt{\alpha \times t}}{r} > 0.5 \tag{1}$$

α: thermal diffusion coefficient of particles (m²/s),
t: heating time in barrel (s),
r: radius of particles (m), Numerical Formula 2

$$2.5 < \frac{Tav}{Tcp} < 4.5 \tag{2}$$

Tav: average temperature of combustion jet in barrel (° C.),
Tcp: cohesion critical temperature of particles (° C.).

The resin coating method of the invention 4 is that, in the above invention 3, the length of the barrel is at least 25 cm.

The resin coating method of the invention 5 is that, in the above invention 3 or 4, the speed of the combustion jet is at least mach 1.

The resin coating method of the invention 6 is that, in any of the above inventions 3 to 5, the substrate is processed for surface roughening.

The resin coating method of the invention 7 is that, in any of the above inventions 3 to 6, the substrate is coated with heating or cooling.

Based on the finding that the adhesion between resin and substrate (mostly metal) is attained not by their mutual affinity but by their physical structure, the present inventors have repeated assiduous studies and, as a result, have developed a method not requiring at all the above-mentioned coating treatment.

The coated member of the invention 1 has an interface structure in which the coating material resin and the substrate break in each other with at least micron-pitch irregularities, and therefore, the two can have extremely strong integrality irrespective of their affinity.

In the invention 2, even with high-molecular-weight polyethylene to which a coating method of melting and fluidizing powder is not applicable, the interface structure of the type can be realized.

According to the method of the inventions 3 to 7, the above-mentioned resin-coated member can be produced in a good and simplified manner.

DETAILED DESCRIPTION OF THE DRAWINGS

DESCRIPTION OF REFERENCE NUMERALS AND SIGNS (1) Combustion Chamber
(11) Combustion Zone
(12) Temperature Control Zone
(13) Inert Gas Supply Port
(13b) Control Valve
(14) Nozzle
(15) Fuel Supply Port
(16) Spark Plug
(2) Barrel
(20) Supply Port
(31) Cooling Water Supply Port
(32) Cooling Water Discharge Port
(A) Substrate
(L) Distance from supply port to spout port
(La) Distance between substrate surface and spout port
(t) Heating Time in barrel

BEST MODE FOR CARRYING OUT THE INVENTION

Figure 1:
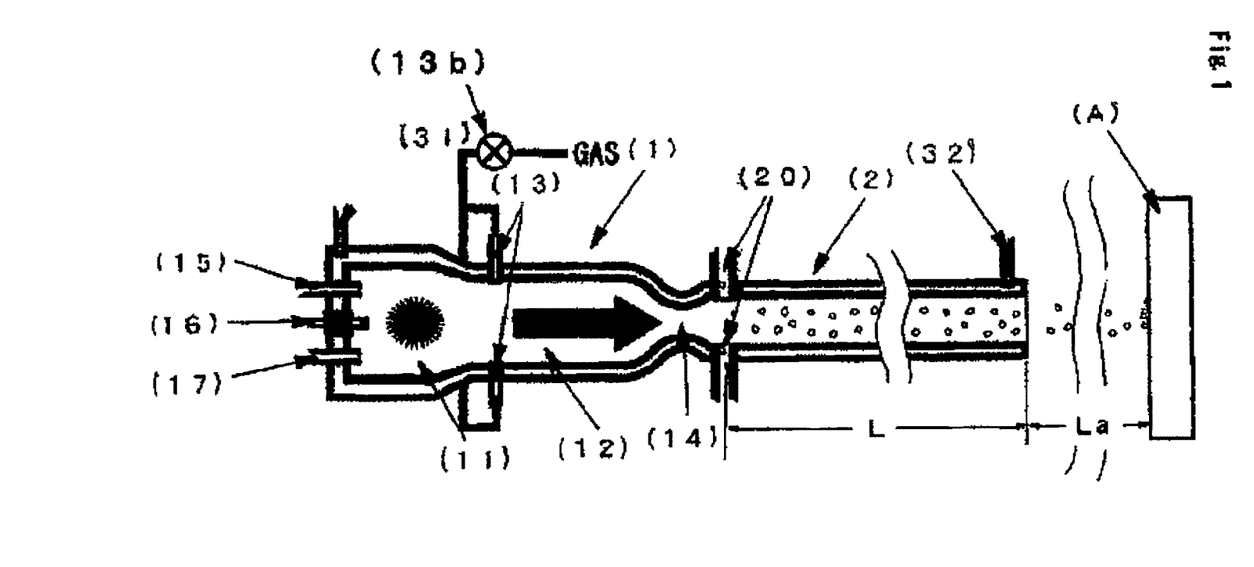
FIG. 1 is a schematic cross-sectional view showing one example of a spray gun usable in the invention

The resin coating method and the resin coated member of the invention are described, for example, with reference to the constitution of a spray gun for HVOF spraying illustrated in FIG. 1.

The spray gun illustrated in FIG. 1 comprises a combustion chamber (1) connected to one end of a barrel (2), in which the combustion chamber (1) comprises, for example, a combustion zone (11), a temperature control zone (12) and a nozzle (14), and the combustion zone (11) is provided with a spark plug (16), a fuel supply port (15) and an oxygen supply port (17) whereby the fuel supply amount and the oxygen supply amount are controllable on the supply side. The temperature control zone (12) is provided with an inert gas supply port (13) so that the supply amount of an inert gas is controlled by the control valve (13b) provided on the supply side to thereby make it possible to control the temperature of the combustion gas. The barrel (2) is provided with a supply port (20) through which coating particles are injected thereinto under pressure, on the side nearer to the combustion chamber.

In the drawing, (A) is a substrate to be coated, and the distance between the surface of the substrate (A) and the spout port is expressed by (La). In the spray gun of FIG. 1, the constitutive members are so designed that they are composed of a double-layered partition wall and provided with a supply port (31) and a discharge port (32) for supplying and discharging cooling water inside the space of the partition wall, thereby making it possible to prevent the outer wall from being heated for stable driving.

The resin coating method of the invention is a coating method through HVOF spraying that comprises generating a combustion jet in the combustion chamber (1) connected to one end of the barrel (2) while controlling the temperature of the combustion jet by supply of an inert gas to the jet, feeding resin coating materials into the temperature-controlled combustion jet and leading them to pass through the barrel (2), and spouting the coating particles through a spout port along with the combustion jet therethrough to thereby coat the surface of the substrate (A); wherein the length of the barrel (L), the temperature of the combustion jet and the physical properties of the coating particles are defined so as to satisfy both the following formulae (1) and (2):

Numerical Formula 3

$$\frac{\sqrt{\alpha \times t}}{r} > 0.5 \tag{1}$$

Numerical Formula 4

$$2.5 < \frac{Tav}{Tcp} < 4.5 \tag{2}$$

In formula (1), $\alpha$ means the thermal diffusion coefficient of the coating particles (m$^2$/s), t means the time for which the coating particles are heated inside the barrel (s), and r means the radius of the coating particles (m). The thermal diffusion coefficient of the coating particles is determined according to the following formula:

$$\alpha = k/\rho \cdot Cp$$

wherein k: thermal conductivity (J/smK), $\rho$: density (kg/m$^3$), Cp: specific heat (K/kgK)/For the thermal conductivity, the density and the specific heat, the data in Material Handbook or the like may be referred to.

t can be obtained from the speed of the combustion jet to be computed from the mass flow rate of the combustion gas and the inert gas, and from the barrel length (L). The barrel length (L) is defined as the distance from the supply port (20) to the spout port at the tip of the barrel (2).

In the formula (2), Tav means an average temperature (° C.) of the combustion jet inside the barrel, and this can be theoretically obtained by (a) computing the temperature of the combustion jet in the temperature control zone from the mass flow rate of the inert gas relative to the combustion gas, then (b) computing the gas temperature profile in the flow direction in the nozzle and the barrel from the viewpoint of fluid dynamics under the condition, and (c) computing the average temperature Tav inside the barrel from the gas temperature profile inside the barrel. Tcp means the cohesion critical temperature (° C.) of the coating particles, and this is the softening temperature of the resin constituting the particles ±10° C. The expression of ±10° C. is because even resins of the same type may slightly differ in the softening temperature thereof depending on the additives therein and on the synthesis degree thereof, the value range can include the difference so as to attain suitable temperature expression.

The combustion jet temperature in HVOF spraying is generally around 3000° C. in a case of no cooling with an inert gas or the like; however, with a spray gun having the constitution as above, the combustion jet temperature could be controlled within a range of approximately from 3000° C. to 300° C. owing to the supply of an inert gas to the jet. In practice, the temperature is controlled to fall within a suitable range of from 1000° C. to 400° C. or so depending on the characteristics of the coating material.

The combustion jet speed is preferably a jet speed of at least mach 1 (supersonic velocity) for attaining high-adhesion resin coating in the resin coating method of the invention. More preferably, it is at least mach 2. The combustion jet speed may be controlled by controlling the flow rate of the fuel and oxygen to be fired and that of the inert gas; and for example, inside the barrel (2), the speed may be a supersonic velocity of around mach 2 in the following Examples. In this, the supply amount of the inert gas may have some influence on the supply amount of fuel and oxygen in the combustion zone (11); and when the insert gas is increased, then the fuel and oxygen may be reduced, but as a result, the temperature control may be possible not having any significant influence on the combustion jet speed (to such a degree with no influence on t). Specifically, even at a low temperature corresponding to the resin, a supersonic combustion jet speed can be realized.

As the fuel, usable are various known heat sources. Typically, for example, there may be mentioned kerosene, acetylene, etc. For realizing the above-mentioned combustion jet speed, a case where kerosene is used as the fuel only as a guide may be mentioned, in which the kerosene flow rate is within a range of from 0.3 to 0.5 SLM or so and the oxygen flow rate is within a range of from 500 to 900 SLM or so, though the data may vary depending on the dimension and the shape of the combustion zone (11) and the nozzle (14). Needless-to-say, it is not limitative. As the inert gas, usable are nitrogen and rare gases such as He, Ar, etc.

The barrel (2) is provided with a supply port (20) through which coating particles are injected thereinto under pressure, on the side nearer to the combustion chamber; and coating particles are spouted out through a spout port on the other end along with the temperature-controlled combustion jet therethrough.

The characteristic feature of the invention of the present application is that, for realizing good coating, the barrel length (L), the combustion jet temperature and the physical properties of the coating particles are suitably defined so as to satisfy the above-mentioned formula (1) and formula (2).

The formula (1) defines the right-hand value, which is a function of the thermal diffusion coefficient of the coating particles $\alpha$ ($m^2/s$), the heating time inside the barrel t (s) and the radius of the particles r (m), to be more than 0.5. The combustion jet temperature is defined to be considerably lower than the temperature in conventional spray guns, as so mentioned in the above, and therefore, when the right-hand value is 0.5 or less, then the coating particles could be heated insufficiently and a good coating layer could not be formed. In case where the right-hand value is larger, then the particles could be uniformly heated as a whole in their collision and therefore it may be considered that the particles could more surely break in the fine irregularities in a broad range and could more readily adhere thereto.

The value of Tav/Tcp in the formula (2) is a ratio of the average temperature of the jet in the barrel Tav (° C.) to the cohesion critical temperature of the coating particles Tcp (° C.), and is defined to be more than 2.5 but less than 4.5. In case where the prevention of thermal degradation of the coating particles is emphasized, then it is desirable that the value of Tav/Tcp is shifted to the lowermost limit side, or that is, the temperature of the combustion jet is lowered; however, when the value is 2.5 or less, then the coating particles could be insufficiently heated and a good, dense and adhesive coating layer could not be formed. On the other hand, in case where the densification of the coating layer and the adhesiveness thereof to the substrate are emphasized, the value of Tav/Tcp may be shifted to the uppermost limit side, or that is, the temperature of the combustion jet may be made high. However, when the value is 4.5 or more, then it is unfavorable since the coating particles may be degraded and could not adhere to the substrate or the physical properties of the coating layer may be degraded.

Regarding the above-mentioned distance (L) in the barrel, the distance is from 10 to 20 cm or so in known spray guns. However, with a barrel having the value L in that range, a good coating layer could not be formed when coating particles having an big thermal diffusion coefficient $\alpha$ and an extremely small particle radius r (m) are not selected, which, however, is impracticable. Accordingly, a special step of surface roughing of a substrate or coating a substrate with a coating layer having good adhesiveness to resin is said to be indispensable, as in the prior art. Contrary to this, in the invention of the present application, even when ordinary resin coating particles of which the thermal diffusion coefficient $\alpha$ and the particle radius r (m) are within an ordinary range are used, simple and good resin coating can be realized so far as a spray gun of which the distance (L) satisfies the above-mentioned formulae (1) and (2) is used. The value L of the spray gun is not specifically defined, but from the past inspection, the value is preferably at least 20 cm, practically at least 25 cm, more preferably at least 30 cm. Typically, the value is preferably from 35 to 50 cm or so in consideration of the physical properties of the coating particles. The present inventors have confirmed that the coating is well possible in case where the total flying distance of the coating particles from the supply port to the substrate is within a range of up to 700 mm. Accordingly, it may be considered that the length to be computed by subtracting the distance (La) between the spout port and the substrate from 700 mm or so can be well defined as the distance (L).

In the resin coating method of the invention, the temperature of the combustion jet is low in accordance with the resin coating particles, and therefore, when the distance (L) of the barrel is at most 20 cm or so like in the prior art, the resin coating particles inside the barrel could not be sufficiently heated; however, when the distance (L) is made not shorter than 25 cm, for example, it is made to be 40 cm or so, then the particles could be sufficiently heated and good coating could be thereby attained.

In a practical coating operation, even after the resin coating particles have been applied to the substrate, the combustion jet is still kept blown to the coated surface for a certain period of time. In this case, when a spray gun in which the distance (L) is longer than before as in the above, or that is, at least 25 cm, for example 40 cm or so is used, then the temperature of the combustion jet could be suitably lowered inside the barrel and the coated resin could be prevented from being thermally degraded.

In the resin coating method of the invention of the present application mentioned in the above, resins heretofore used in various coating compositions can be used as the coating particles in the same manner as therein. For example, they include the following:

Polyethylene (PE), polypropylene (PP), polystyrene (PS), acrylonitrile/styrene resin (AS), acrylonitrile/butadiene/styrene resin (ABS), methacrylic resin (PMMA), vinyl chloride (PVC), polyamide (PA), polyacetal (POM), ultra-high-molecular polyethylene (UHPE), polybutylene terephthalate (PBT), GF-reinforced polyethylene terephthalate (GF-PET), polymethylpentene (TPX), polycarbonate (PC), modified polyphenylene ether (PPE), polyphenylene sulfide (PPS), polyether-ether ketone (PEEK), liquid-crystal polymer (LCP), polytetrafluoroethylene (PTFE), polyether imide (PEI), polyarylate (PAR), polysulfone (PSF), polyether sulfone (PES), polyamidimide (PAI).

The particle size of the coating particles is not specifically defined so far as the above-mentioned formulae (1) and (2) are satisfied; however, in consideration of the thermal diffusion coefficient $\alpha$ and others of the individual materials, those having a particle size suitable for coating may be selected and used.

The substrate to be coated is not also specifically defined, for which are usable not only carbon steel but also various metals and alloys as well as ceramics of inorganic materials and others such as those mentioned below.

Metals (magnesium, aluminium, copper, iron, titanium, etc.) and their alloy ceramics (oxides such as alumina; nitrides such as TiN; carbides such as SiC; borides such as B4C), etc.

Keeping the substrate at a suitable temperature, for example, resin substrates mentioned below may also be readily coated.

Plastics (ordinary plastics such as polyethylene, polyvinyl chloride, polypropylene, polystyrene; polyvinyl acetate, ABS resin, AS resin, acrylic resin, polyacetal, polyimide, polycarbonate, modified polyphenylene ether (PPE), polybutylene terephthalate, polyarylate, polysulfone, polyphenylene sulfide, polyether-ether ketone, polyimide resin, fluororesin, etc.

In the invention of this application, one preferred embodiment comprises surface roughening the substrate. As the surface-roughening means, employable is a known method of blasting, etc. Preferably, the surface of the substrate is roughened to have irregularities so as to increase the contact area thereof with the coating material applied thereto. The roughness of the irregularities is not specifically defined so far as it does not have any influence on the uniformity and the strength of the coating film; and the irregularities may be formed in the entire surface or a part of the surface of the substrate. In the invention, micron-pitch irregularities of at most 1 μm may well exhibit the function thereof. This is because, according to the method of the invention of the present application, the coating material is made to collide against the substrate at a high speed along with a suitably temperature-controlled combustion jet thereto, and therefore, the coating material can be step into even extremely small irregularities in the surface of the substrate. This may be considered because, even when the substrate has micro-irregularities existing therein, some far larger physical force may be generated as compared with the physical force negative to the contact between the substrate and the coating material, such as the surface tension of the coating material, air invasion, etc.

Accordingly, not only by the irregularities of the substrate of itself but also by the irregularities mechanically formed in the substrate, the coating layer and the substrate may be mechanically strongly bonded to each other.

In the invention of this application, the substrate to be coated may be heated or cooled in coating it. In this case, the substrate may be set at any desired temperature, and as one embodiment in practice, a temperature range from a temperature at which the coating particles soften to a temperature lower by about 50° C. than it may be employed for the temperature as a general guide. This is for the purpose of unifying the temperature of the target surface when the coating particles adhere to the substrate; and accordingly, coating of excellent adhesiveness for good coating film condition can be attained. In particular, this is effective in a case where the above-mentioned resin is used as the substrate.

Figure 6:
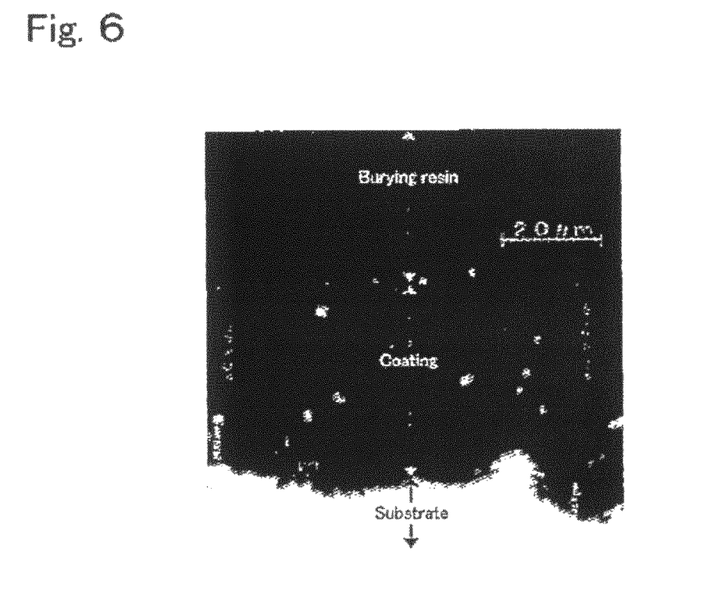
FIG. 6 is an enlarged cross-sectional view of FIG. 5.

The resin coated member of the invention thus produced in the Manner as above is a resin coated member in which the surface of the substrate is coated with a coating material of resin, and the interface between the coating material and the substrate surface has a structure where the substrate and the coating resin break in each other with at least micron-pitch irregularities therebetween and are directly integrated, for example, as illustrated in FIG. 6. The micron-pitch irregularities may be understood as irregularities of such that the distance between the adjacent projections thereof is on an order of micrometer. Typically, the distance between the adjacent projections may be at most tens micrometers or so, preferably at most a few micrometers. Preferably, the irregularities are in the entire interface between the coating material and the substrate surface, but may be partly in the interface, and there is no specific limitation thereon.

Characteristically, in the resin coated member of the invention, the resin coating material can break in the inside of even the micro-recesses of, for example, not larger than a few micrometers, of which the width of the inner space is larger than in the substrate surface part, therefore forming an intricate resin/substrate interface constitution. This constitution can be realized only by deep stepping of the coating material into the depth of the substrate surface by the supersonic combustion jet; and accordingly, the two may have an extremely strong integrality by the mechanical structure thereof irrespective of their affinity to each other.

In the prior art of resin coating with solvent, the contact between the substrate surface and the resin is only by chemical affinity of the two. Accordingly, for example, when the substrate surface has irregularities, they may bring about some physical force that could not be overcome by the affinity, for example, bridge formation by the surface tension of the coating material, solvent vapor accumulation, air invasion, etc.; and therefore, the irregularities are undesirable. However, it is almost impossible to mirror-finish the substrate surface and, as a result, in solvent coating, it is impossible to make the coating material break in micro-level irregularities.

Also in simple resin melt coating by conventional HVOF spraying, it may be difficult for the molten material to break in the micro-level irregularities in the substrate surface such as those mentioned in the above, in consideration of the surface tension and the affinity of the coating material melt as well as air invasion, etc.

Contrary to this, in the invention of the present application where a coating material is made to impact against a substrate at a high speed over the sonic speed, it has become possible for the first time to generate a physical force far larger than the above-mentioned negative physical force (surface tension of coating material, solvent vapor accumulation, air invasion, etc.), and as a result, it may be considered that the coating material could be made to step in even extremely small irregularities with no influence of the negative physical force thereon.

As the coating material, usable are resins for use in various coating materials such as those mentioned in the above; and as the substrate, usable are various metals and their alloy ceramics and resin substrates such as those mentioned in the above.

Now the invention is described in more detail with reference to the following Examples. Needless-to-say, the invention is not restricted by the following Examples.

EXAMPLES

Example 1

Spray Gun Spraying

FIG. 1 is a schematic vertical cross-sectional view illustrating the constitution of a spray gun used in the resin coating method of the invention.

The spray gun comprises a combustion chamber (1) and a barrel (2). The combustion chamber (1) comprises a combustion zone (11), a temperature control zone (12) and a nozzle (14); and the combustion zone (11) is provided with a spark plug (16), a fuel supply port (15) and an oxygen supply port (17), and the fuel feed rate and the oxygen feed rate can be controlled on the supply side. The temperature control zone (12) is provided with an inert gas supply port (13), and the temperature of the combustion gas can be controlled by controlling the feed rate of the inert gas by the control valve (13*b*) provided on the supply side. The combustion gas generated in the combustion zone (11) is cooled in the temperature control zone (12) by supply of a suitable amount of an inert gas thereinto and its temperature is thereby controlled, and this is fed to the barrel (2) as a combustion jet through the nozzle (14). The speed of the combustion jet is supersonic of mach 2 or so in the barrel (2), and the temperature of the combustion jet can be controlled within a range of from 3000 to 400° C. The constitutive members are so designed that they are composed of a double-layered partition wall and provided with a supply port (31) and a discharge port (32) for supplying and discharging cooling water inside the space of the partition wall, thereby making it possible to prevent the outer wall from being heated for stable driving. (A) is a substrate to be coated; and the distance between the surface of the substrate (A) and the spout port is expressed as (La).

Figure 2:
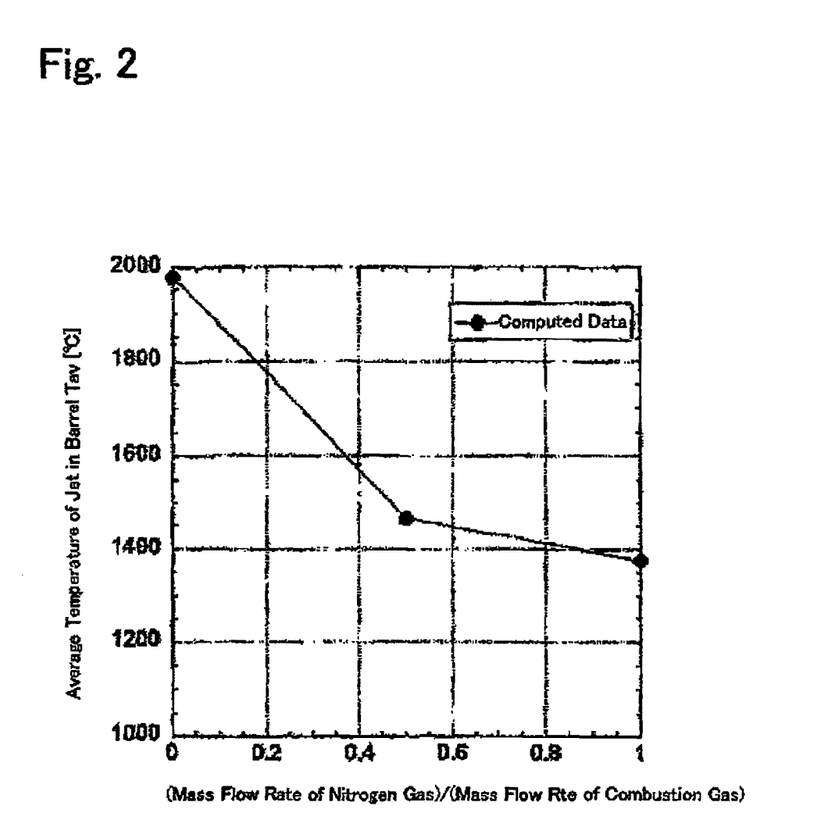
FIG. 2 is a graph illustrating the result of computing the jet average temperature Tav in a barrel.

Kerosene was used as the fuel of the combustion jet, and nitrogen was used as the inert gas; and the average temperature in the barrel, Tav was computed in this case, and the data are shown in FIG. 2. In that manner, it is known that, when the feed rate of the fuel and oxygen and the feed rate of the inert gas are suitably controlled, then the temperature and Tav of the combustion jet can be controlled.

Regarding Control of Spray Gun Condition

Figure 3:
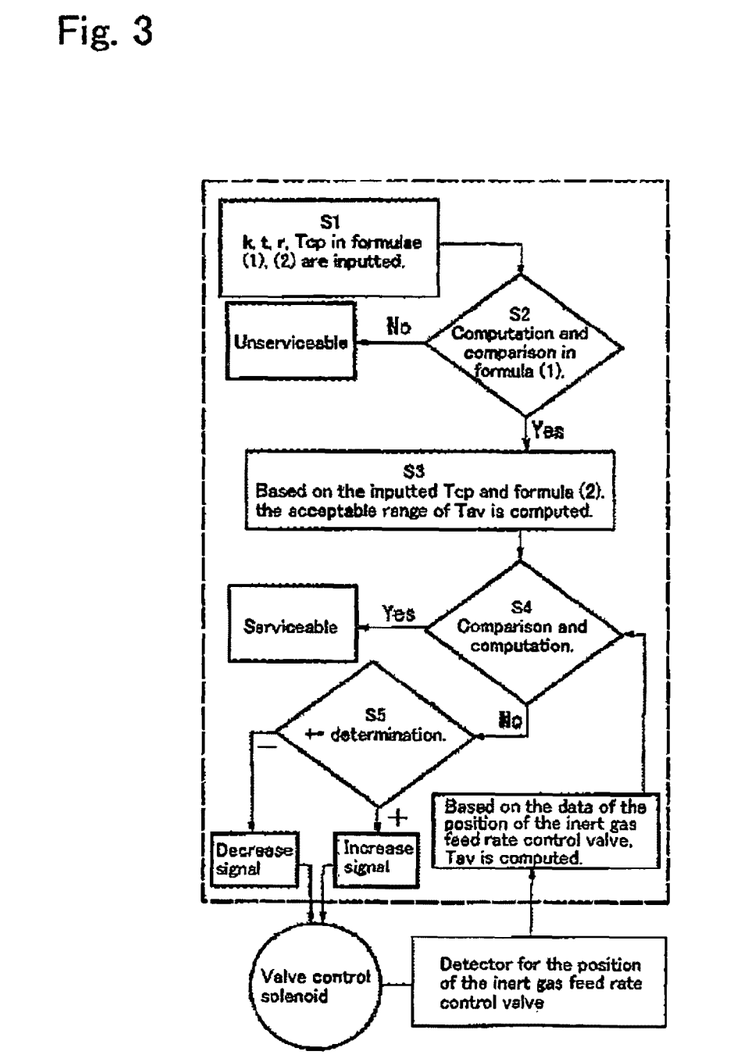
FIG. 3 is a flowchart showing one example of a resin coating method of the invention.

FIG. 3 is a flow chart describing one example of spray gun control for realizing the coating method of the invention. In the drawing, the area surrounded by the dash line is by computer software operation.

The operation is according to the following process.

S1:
α (thermal diffusion coefficient of the coating particles to be used ($m^2/s$)), r (radius of the particles (m)), Tcp (cohesion critical temperature of the particles (° C.)) and t (heating time in barrel to be determined by the barrel length L (s)) are inputted.

S2:
Based on the formula (1), it is determined as to whether or not a predetermined spray gun can be used with the inputted data (as to whether or not the data satisfy the formula (1)); and in case where the data do not satisfy the formula, then a message of "unserviceable" is expressed on a display or the like.

On the contrary, when the formula (1) is satisfied, then the process goes ahead to S3, and the inputted Tcp data are fed to S3.

S3:
Based on the Tcp data fed from S2, the acceptable range of Tav (average temperature of jet in barrel (° C.)) is determined according to the formula (2), and this is fed to S4.

S4:
Based on the position information from the detector of detecting the position of the valve for controlling the feed rate of inert gas, the computed Tav at the current stage is compared with the Tav range computed in the previous S3; and in case where the former falls within the Tav range, then a message of "serviceable" is displayed.

On the contrary, in case where the computed Tav is outside the range, then the signal of + or − obtained in the computation result are fed to S5.

S5:
The fed signal is determined as to whether it is plus or minus. In a plus case, an increase signal is outputted to the valve control solenoid; and in a minus case, a decrease signal is thereto.

Until the signal of "serviceable" is expressed or the operation stop is inputted, S4 and S5 are repeated so that the feed rate of inert gas can be automatically controlled in accordance with the physical properties of the coating particles or the characteristics of the spray gun to be used.

The repetition interval must be not shorter than the time interval of a period of time for which one-round solenoid operation is finished, for enhancing the system stability and reliability.

In case where the spray gun of FIG. 1 is used, the speed of the combustion jet is determined by the amount of the combustion gas to be generated in the initial stage (in case where the inert gas is fed in a lowermost limit amount corresponding to resin) but is not so much influenced by the feed rate of inert gas to such a degree that it has some influence on t (heating time in barrel (s)); however, t may vary depending on the size of the spray gun. Accordingly, it is also possible to previously input a conversion formula intrinsic to the experimentally-settled spray gun so that the barrel length L inputted in the formula can be automatically converted into t.

Resin Coating Experiment Result

Using a spray gun having the above-mentioned constitution in the above-mentioned control system, resin coating was attained under the conditions mentioned below, and the results are shown in Table 1.

As the coating particles, used was an ultra-high-molecular weight polyethylene, Mitsui Chemical's Mipelon XM220. Its thermal diffusion coefficient α is 2.4, and its adhesion critical temperature Tcp is 393K. As the fuel, used were kerosene at a flow rate of 0.35 SLM and oxygen at a flow rate of 670 SLM. An inert gas (nitrogen) was fed at a flow rate of 0, 500 or 1000 SLM.

The barrel distance (L) was 16 inches in Nos. 1 to 15, and 8 inches in Nos. 16 to 18. Under the condition, the heating time in barrel, t was set as $0.8 \times 10^{-3}$ sec, and $0.4 \times 10^{-3}$ sec, respectively.

Figure 4:
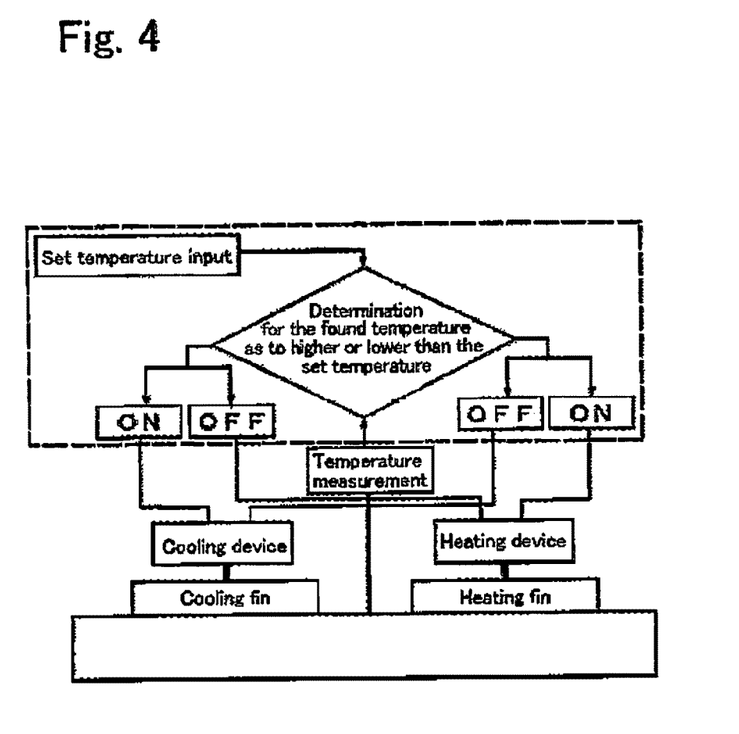
FIG. 4 is a conceptual view showing one example of a method of temperature control of a substrate.

Controlling the temperature of the substrate (A) was tried as in FIG. 4. The substrate temperature control was as follows: Based on the difference between the measured system temperature and the measured substrate temperature, in case where the measured system temperature is high, the cooling device is put ON and the heating device is cut OFF; but in case where the measured system temperature is low, the operation is contrary to the above; whereby the substrate is heated or cooled to make it have the preset temperature.

As the substrate, used was carbon steel (SS400).

As obvious from the results in Table 1, the coating under the condition satisfying the above-mentioned formulae (1) and (2) resulted in good resin coating of substrate in a uniform thickness, and the formed coating layer was extremely dense. The thickness of the coating layer could be readily controlled to a degree of from a few μm to a few hundred μm.

TABLE 1

| Experiment No | Coating Particles | | | | Barrel | | Inert Gas | | Substrate | temperature control (° C.) |
|---|---|---|---|---|---|---|---|---|---|---|
| | material | Tcp | α | d | L | t | L/min | Tav | material | |
| 1 | polyethylene | 393 | 2.4 | 43 | 16 | 0.8 | 1000 | 1489 | carbon steel | no |
| 2 | " | " | " | " | " | 0.8 | " | " | " | no |
| 3 | " | " | " | " | " | 0.8 | " | " | " | no |
| 4 | " | " | " | " | " | 0.8 | " | " | " | no |
| 5 | " | " | " | " | " | 0.8 | " | " | " | 100 |
| 6 | " | " | " | " | " | 0.8 | " | " | " | 100 |
| 7 | " | " | " | " | " | 0.8 | " | " | " | 100 |
| 8 | " | " | " | " | " | 0.8 | " | " | " | 100 (only at the start point) |
| 9 | " | " | " | " | " | 0.8 | " | " | " | no |
| 10 | " | " | " | " | " | 0.8 | 1500 | 1342 | " | no |
| 11 | " | " | " | " | " | 0.8 | " | " | " | 100 |
| 12 | " | " | " | " | " | 0.8 | " | " | " | 100 |
| 13 | " | " | " | 162 | " | 0.8 | 500 | 1654 | " | no |
| 14 | " | " | " | " | " | 0.8 | 1000 | 1489 | " | 100 |
| 15 | " | " | " | " | " | 0.8 | 1500 | 1342 | " | 100 |
| 16 | " | " | " | 43 | 8 | 0.4 | 500 | 1822 | " | 100 |
| 17 | " | " | " | " | " | 0.4 | 1000 | 1605 | " | 100 |
| 18 | " | " | " | 162 | " | 0.4 | 500 | 1822 | " | 100 |

| Experiment No | La mm | n times | Formula (1) >0.5 | Formula (2) Tav/Tcp | Coating Layer thickness (μm) | condition |
|---|---|---|---|---|---|---|
| 1 | 200 | 4 | 0.64 | 3.79 | 33 | ⊖ |
| 2 | " | 4 | 0.64 | 3.79 | 43 | ⊖ |
| 3 | " | 1 | 0.64 | 3.79 | 4 | ○ |
| 4 | " | 2 | 0.64 | 3.79 | 18 | ⊖ |
| 5 | " | 1 | 0.64 | 3.79 | 18 | ⊖ |
| 6 | " | 2 | 0.64 | 3.79 | 24 | ⊖ |
| 7 | " | 4 | 0.64 | 3.79 | 219 | ⊖ |
| 8 | " | 6 | 0.64 | 3.79 | 66 | • |
| 9 | " | 2 | 0.64 | 3.79 | 27 | ⊖ |
| 10 | " | 4 | 0.64 | 3.41 | 7 | ○ |
| 11 | " | 4 | 0.64 | 3.41 | 105 | ⊖ |
| 12 | " | 10 | 0.64 | 3.41 | 233 | ⊖ |
| 13 | " | 4 | 0.17 | 4.21 | 5 | Δ |
| 14 | " | 4 | 0.17 | 3.79 | 5 | Δ |
| 15 | " | 4 | 0.17 | 3.41 | | X |
| 16 | " | | 0.45 | 4.64 | 50 | ◆ |
| 17 | " | | 0.45 | 4.08 | | X |
| 18 | " | 4 | 0.12 | 4.64 | | X |

Tcp: cohesion critical temperature of coating particles (K)
d: diameter of coating particles (μm)
α: thermal diffusion coefficient at coating particles used (×$10^{-3}$ m$^2$/s)
Tav: average temperature or jet in barrel (K)
L: barrel length (inch)
t: heating time in barrel (×$10^{-3}$ s)
La: distance between spout port and substrate surface (mm)
n: spray gun scanning frequency
Inert gas: nitrogen gas was used.
⊖: Firmly adhered, dense and smooth surface coating layer was formed.
○: Adhesion efficiency was low, but the same coating layer as in ⊖ was formed.
•: The surface was wrinkled, but in the other aspects, the same coating layer as in ⊖ was formed.
Δ: The adhesion power of the coating layer to the substrate was weak, and layer readily dropped.
◆: The coating layer discolored in black.
X: Not adhered.

Figure 5:
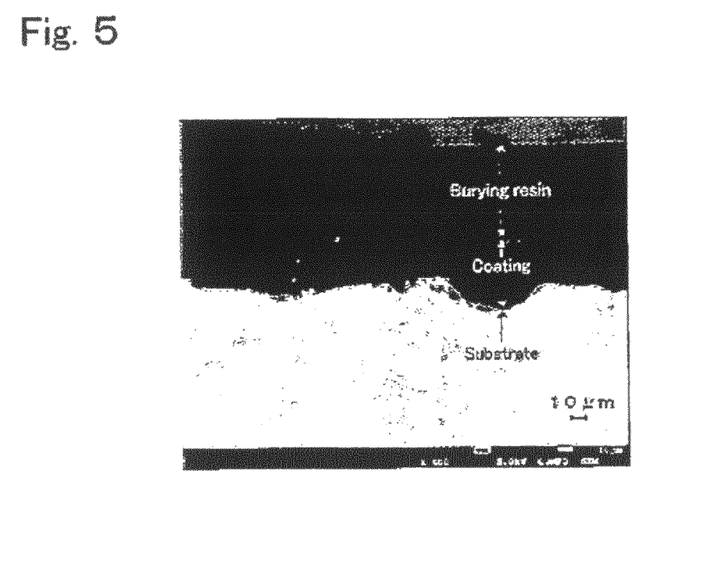
FIG. 5 is a cross-sectional view showing one example of the interface between the coating layer and the substrate in a resin coated member of the invention.

The cross section of the coated substrate of Experiment No. 2 is shown in FIG. 5. The coating material broke in the depth of the substrate surface through supersonic jetting thereof, and it is understood that the coating firmly fixed to the substrate not only by adhesion but also by mechanical profile. This aspect was observed in more detail, as in FIG. 6, in which it is obvious that the coating material broke in the irregularities of the substrate surface existing at a pitch of at most 1 μm.

On the other hand, under the condition not satisfying the formulae (1) and (2), it was confirmed that the adhesiveness of the coating layer to the substrate was poor, or the coating could not be attained, or the coating layer was discolored or deteriorated by thermal degradation. For example, even though the coating layer was formed, it discolored in black.

Figure 7:
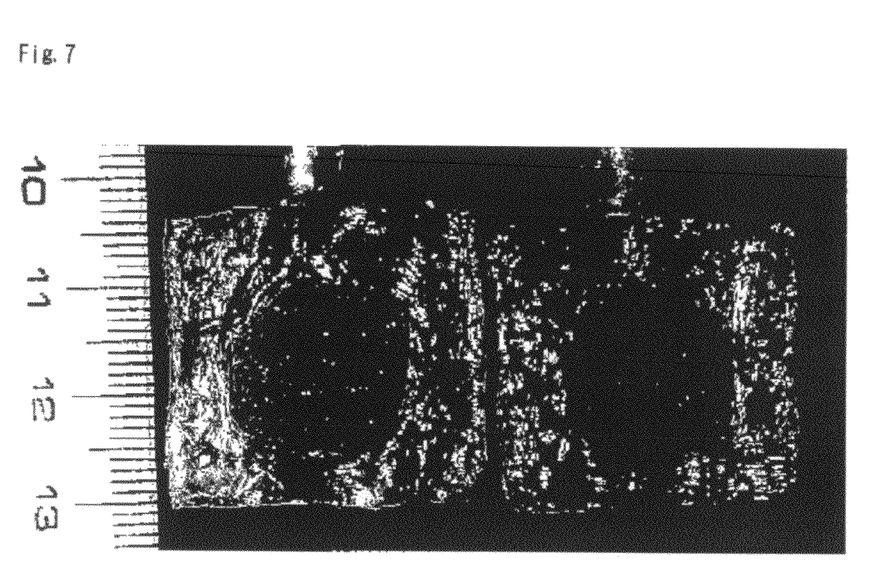
FIG. 7 is a view illustrating the test result of the substrate protecting capability of the coating layer obtained with a spray gun and its control system of the invention.

Further, under the same condition as in Experiment No. 2, a polyethylene coating (having a thickness of 50 microns) was formed on a substrate of carbon steel SS400, and then a copper wire was connected to the backside of the substrate, and the coated surface except 2 cm² left as such, was insulation-coated with a silicon resin. The sample was dipped in artificial seawater at room temperature for 5 days. The result is shown in FIG. 7. No rust formed on the surface of the coating layer, and it is confirmed that the coated surface kept the same condition as that before dipping. It is known that, as coated with the uniform and dense polyethylene coating layer, the resin coated member could have an excellent barrier function even though the coating layer was thin and had a thickness of 50 μm.

Example 2

Figure 8:
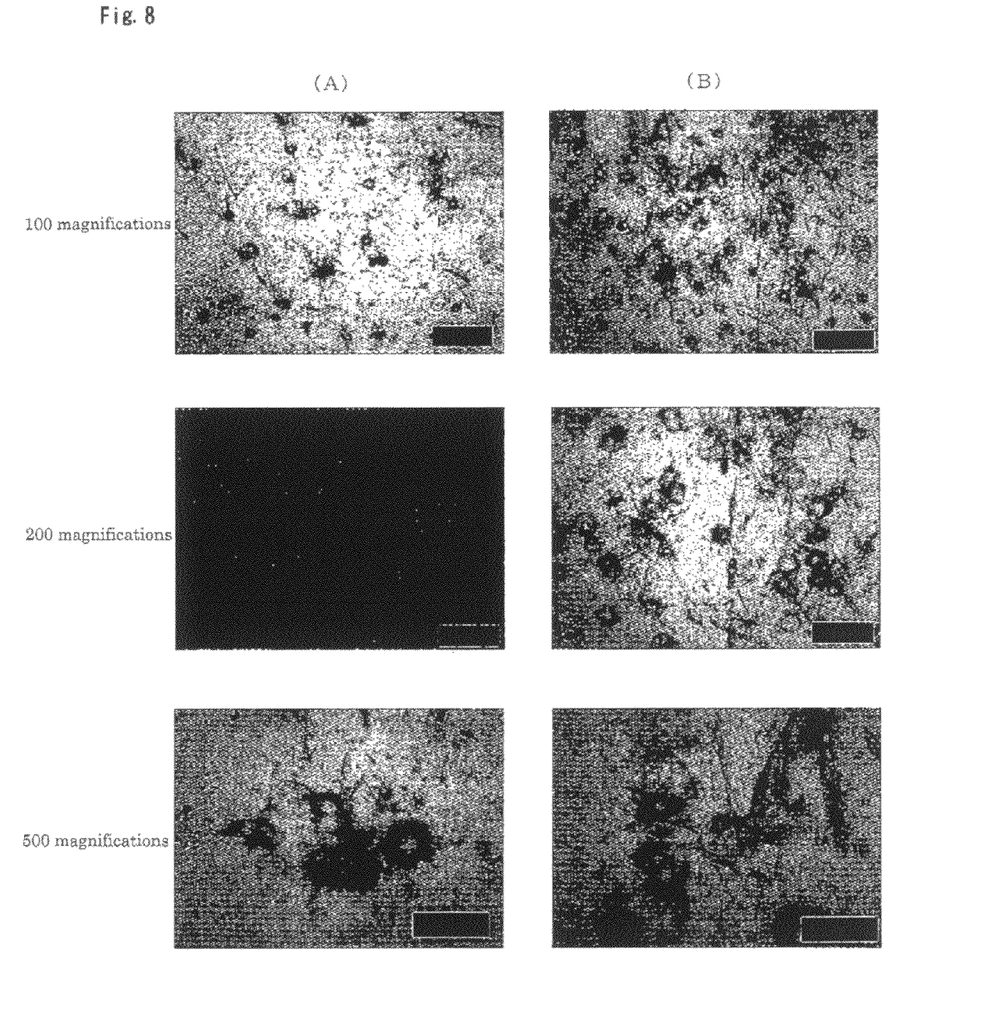
FIG. 8 includes views illustrating the observation result of the resin-coated layer in the invention (A) and in a comparative example (B).

Using the spray gun as in Example 1, polyethylene was blown onto a mirror-polished 304 stainless steel sheet. The coating condition is mentioned below. FIG. 8 includes observation results of the resin coating according to the method of the invention of the present application (A) and the resin coating in a comparative example (B).

Barrel length: (A) 8 inches, (B) 16 inches
Amount of nitrogen gas added: 500 L/min
Spray distance: 50 mm
Observation power: 100, 200, 500 magnifications As in FIG. 8, (A) show parts swollen like the yolk of a fried egg; but (B) show larger parts looking like the egg white of a fried egg. This may be presumed because, in (A), the heating time could be sufficient and the ratio of the molten polyethylene could be larger and the deposited volume of polyethylene could also be larger, and therefore the coating layer could be thick; but in (B), the molten amount of polyethylene would be small and the volume thereof would be also small.

Industrial Applicability

According to the resin coating method of the invention, a uniform and firm resin coating may be formed in a solvent-free simplified manner, readily on already-constructed structures, etc. In addition, the invention provides resin coated members improved in the environment-resistant capabilities such as electric insulation, corrosion resistance, rust resistance, antifouling, chemical resistance, impact resistance, abrasion resistance, bending resistance, tensile damage resistance, etc.

The invention claimed is:

1. A coating method through HVOF (high-velocity oxy fuel) spraying that comprises generating a combustion jet in a combustion chamber connected to one end of a barrel while controlling the temperature of the combustion jet by supply of an inert gas to the jet, feeding resin coating particles into the temperature-controlled combustion jet and leading the resin coating particles and the combustion jet to pass through the barrel, and spouting the resin coating particles through a spout port along with the combustion jet therethrough to thereby coat the substrate surface; wherein the length of the barrel, the temperature of the combustion jet and the physical properties of the resin coating particles are defined so as to satisfy both the following formulae (1) and (2):

Numerical Formula 1

$$\frac{\sqrt{\alpha \times t}}{r} > 0.5 \quad (1)$$

α: thermal diffusion coefficient of the resin coating particles (m²/s),
t: heating time of the resin coating particles in the barrel (s),
r: radius of the resin coating particles (m), Numerical Formula 2

$$2.5 < \frac{Tav}{Tcp} < 4.5 \quad (2)$$

Tav: average temperature of combustion jet in the barrel (° C.),
Tcp: cohesion critical temperature of the resin coating particles (° C.), 2. The resin coating method as claimed in claim 1, wherein the length of the barrel is at least 25 cm.

3. The resin coating method as claimed in claim 1, wherein the speed of the combustion jet is at least mach 1.

4. The resin coating method as claimed in claim 1, wherein the substrate is further processed by surface roughening.

5. The resin coating method as claimed in claim 1, wherein the substrate is heated or cooled during coating.

* * * * *